(12) United States Patent
Liu et al.

(10) Patent No.: US 9,239,485 B2
(45) Date of Patent: Jan. 19, 2016

(54) TOUCH DISPLAY PANEL AND FABRICATION METHOD THEREOF, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Haisheng Wang, Beijing (CN); Shengji Yang, Beijing (CN); Hongjuan Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 92 days.

(21) Appl. No.: 14/349,705

(22) PCT Filed: Jun. 6, 2013

(86) PCT No.: PCT/CN2013/076889
§ 371 (c)(1),
(2) Date: Apr. 4, 2014

(87) PCT Pub. No.: WO2014/139226
PCT Pub. Date: Sep. 18, 2014

(65) Prior Publication Data
US 2014/0327843 A1    Nov. 6, 2014

(30) Foreign Application Priority Data

Mar. 11, 2013 (CN) .......................... 2013 1 0076903

(51) Int. Cl.
*G02F 1/1335* (2006.01)
*G02F 1/1333* (2006.01)
*G06F 3/041* (2006.01)
*G02F 1/1343* (2006.01)

(52) U.S. Cl.
CPC ...... *G02F 1/13338* (2013.01); *G02F 1/133345* (2013.01); *G02F 1/134336* (2013.01); *G06F 3/041* (2013.01); *G02F 1/133512* (2013.01); *Y10T 29/49105* (2015.01)

(58) Field of Classification Search
CPC .................................................. G02F 1/13338
See application file for complete search history.

(56) References Cited

U.S. PATENT DOCUMENTS

2011/0222008 A1    9/2011  Moriwaki et al.
2012/0105337 A1*   5/2012  Jun et al. .................. 345/173
2014/0118283 A1    5/2014  Wang et al.

FOREIGN PATENT DOCUMENTS

CN    101320107 A    12/2008
CN    102193262 A    9/2011

(Continued)

OTHER PUBLICATIONS

International Search Report for International Application No. PCT/CN2013/076889, 13pgs.

(Continued)

*Primary Examiner* — Timothy L Rude
(74) *Attorney, Agent, or Firm* — Ladas & Parry LLP

(57) ABSTRACT

Embodiments of the invention disclose a touch display panel and a fabrication method thereof, and a display device. The touch display panel comprises a color filter substrate. A first conductive layer (1021) is formed on a base substrate (103) of the color filter substrate, and a first insulation layer (1101) is formed on the first conductive layer (1021). A pattern of the first conductive layer (1021) is same as a pattern of a black matrix (104) that is formed on the base substrate (103). A pattern of the first insulation layer (1101) in a display region of the touch display panel is same as a pattern of the first conductive layer (1021) in the display region.

12 Claims, 1 Drawing Sheet

(56) References Cited

FOREIGN PATENT DOCUMENTS

| CN | 102749766 A | 10/2012 |
| CN | 202735636 U | 2/2013 |

OTHER PUBLICATIONS

International Preliminary Report on Patentability Appln. No. PCT/CN2013/076889; Dated Sep. 15, 2015.

* cited by examiner ical schematic view illustrating a touch display panel according to an embodiment of the invention.

TOUCH DISPLAY PANEL AND FABRICATION METHOD THEREOF, AND DISPLAY DEVICE

CROSS REFERENCE TO RELATED APPLICATIONS

This application is based on International Application No. PCT/CN2013/076889 filed on Jun. 6, 2013, which claims priority to Chinese National Application No. 201310076903.3 filed on Mar. 11, 2013. The entire contents of each and every foregoing application are incorporated herein by reference.

TECHNICAL FIELD

Embodiments of the invention relate to a touch display panel and a fabrication method thereof, and a display device.

BACKGROUND

Currently, liquid crystal display (LCD) panel plays a dominant role in the panel display field. The touch function of the LCD panel is generally achieved in "In-Cell" mode or "On-Cell" mode. In the "In-Cell" mode, the component for achieving the touch function is embedded in pixels of the LCD panel. In the "On-Cell" mode, the component for achieving the touch function is formed between a color filter substrate of the LCD panel and a polarizing film corresponding to the color filter substrate.

FIG. 1 is a structural schematic view illustrating a conventional touch display panel in the "On-Cell" mode. In FIG. 1, a reference number 101 refers to a polarizing film, and a reference number 103 refers to a base substrate of the color filter substrate. The base substrate 103 may be made of glass or plastic. A black matrix 104, a color filter layer 105, a common electrode layer 106 and an alignment layer 107 are formed on the base substrate 103. A conductive layer 102 is provided between the polarizing film 101 and the base substrate 103. The conductive layer 102 is used to form a capacitive sensor for achieving the touch function. When a user puts a finger on the polarizing film 101, a coupling capacitance $C_f$ is formed between the finger of the user and the conductive layer 102 due to an electric field caused by the user's body. In addition, further referring to FIG. 1, a reference number 109 refers to an array substrate, and a polarizing film 101 is provided on an outer side of the array substrate 109. Liquid crystal 108 is filled between the array substrate 109 and the color filter substrate. The conductive layer 102 is typically formed of Indium Tin Oxide (ITO).

In the structure as shown in FIG. 1, the conductive layer 102 is fabricated on the entire surface of the base substrate 103 of the color filter substrate, and thus the conductive layer 102 reduces the transmittance of the liquid crystal display panel. In addition, since the conductive layer 102 is fabricated on an outer side of the base substrate 103 and is not provided on a same side as the black matrix 104 and the color filter layer 105 formed on the base substrate 103; therefore, a substrate reversal process has to be performed, which increases the complexity of the process.

SUMMARY OF THE INVENTION

According to one embodiment of the invention, a touch display panel is provided. The touch display panel comprises a color filter substrate. A first conductive layer is formed on a base substrate of the color filter substrate, and a first insulation layer is formed on the first conductive layer. A pattern of the first conductive layer is same as a pattern of a black matrix that is formed on the base substrate. A pattern of the first insulation layer in a display region of the touch display panel is same as a pattern of the first conductive layer in the display region.

According to another embodiment of the invention, a display device is provided. The display device comprises the above-mentioned touch display panel.

According to still another embodiment of the invention, a fabrication method of a touch display panel is provided. The touch display panel comprises a color filter substrate. The method comprises: forming a first conductive layer on a base substrate of the color filter substrate by using a mask which is same as a mask for forming a black matrix; and forming a first insulation layer on the base substrate on which the first conductive layer has been formed. A pattern of the first insulation layer in the display region of the touch display panel is same as a pattern of the first conductive layer in the display region.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

Figure 1:
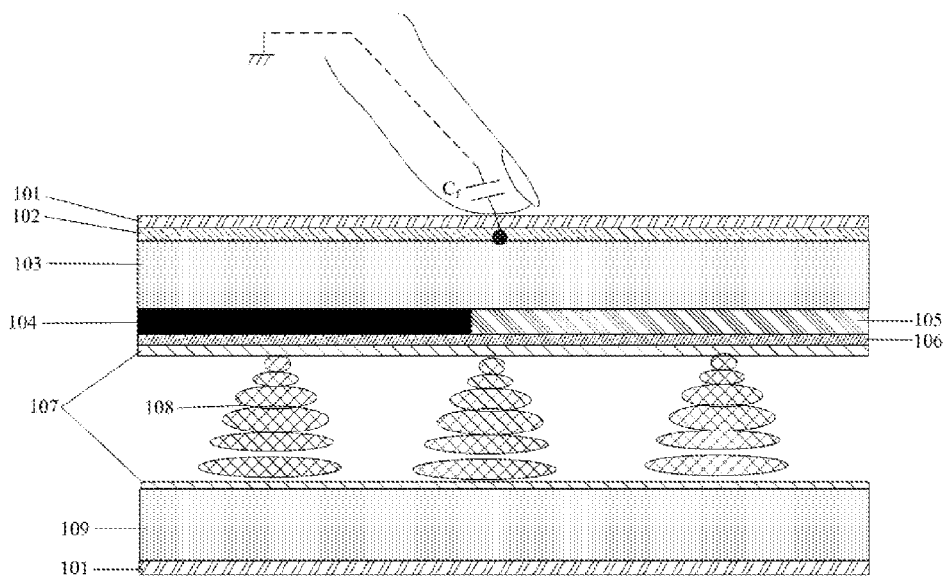
FIG. 1 is a structural schematic view illustrating a conventional touch display panel in a "On-Cell" mode.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

An embodiment of the invention provides a fabrication method of a touch display panel, the method comprises a process of fabricating a color filter substrate, and the process of fabricating the CF substrate comprises steps as follows.

Step 201: forming a first conductive layer on a base substrate of the CF substrate by using a mask which is same as a mask for forming a black matrix;

The base substrate of the color filter substrate may be a glass substrate or a plastic substrate. On the base substrate of the color filter substrate, the first conductive layer is formed by using the mask which is same as the mask for forming the black matrix. That is to say, since the first conductive layer is formed by using the mask which is same as the mask for forming the black matrix, the first conductive layer and the black matrix formed on the color filter substrate have a same pattern. The first conductive layer is used for forming a capacitive sensor for achieving the touch function, and the first conductive layer may be made of ITO. Of course, the first conductive layer according to the embodiment of the invention is not limited to be made of ITO, any other materials suitable for forming the capacitive sensor on the color filter substrate fall into the protection scope of the embodiment of the invention as well.

Step 202: forming a first insulation layer on the base substrate on which the first conductive layer has been formed.

The first insulation layer may be made of silicon dioxide ($SiO_2$). Of course, the first insulation layer according to the embodiment of the invention is not only limited to be made of $SiO_2$, any other materials for forming the insulation layer on the color filter substrate fall into the protection scope of the embodiment of the invention as well. In the display region of the touch display panel, the first insulation layer has a pattern same as the pattern of the first conductive layer. In the peripheral welding region outside the display region, the first insulation layer is removed so as to facilitate the electrical connection of the first conductive layer.

Then, on the base substrate on which the first insulation layer has been formed, the black matrix is formed by using the mask for forming the black matrix. The step for forming the black matrix and the subsequent steps thereof are similar to the steps in fabricating the conventional color filter substrate, which will not be described herein.

For example, after step 202, the above-mentioned process of fabricating the color filter substrate may further comprise steps as follows.

Step 203: forming a second conductive layer on the base substrate on which the first insulation layer has been formed, wherein the second conductive layer is grounded (for example, the second conductive layer is connected to a metal frame of the touch display panel).

In the display region of the touch display panel, a pattern of the second conductive layer is same as the pattern of the first conductive layer. The second conductive layer is grounded via a lead in the peripheral lead region outside the display region.

The second conductive layer may be made of ITO, or other conductive materials.

Step 204: forming a second insulation layer on the base substrate on which the second conductive layer has been formed.

In the display region of the touch display panel, a pattern of the second insulation layer is same as the pattern of the first conductive layer. In other regions except the display region, the second insulation layer ensures no electrical connection between the second conductive layer and a common electrode layer (if the common electrode layer is provided on the color filter substrate), and ensures the normal electrical connection of the first conductive layer.

The second insulation layer may be made of silicon dioxide ($SiO_2$), or other insulation materials.

Then, on the base substrate on which the second insulation layer has been formed, the black matrix is formed by using the mask for forming the black matrix. The step for forming the black matrix and the subsequent steps thereof are similar to the normal steps in fabricating the color filter substrate, which will not be described herein.

An embodiment of the invention further provides a touch display panel. In the touch display panel, a first conductive layer is formed on a base substrate of a color filter substrate, a first insulation layer is formed on the first conductive layer, and a black matrix is formed on the first insulation layer. A pattern of the first conductive layer is same as a pattern of the black matrix. A pattern of the first insulation layer in a display region is same as a pattern of the first conductive layer in the display region. The black matrix, the first conductive layer, and the first insulation layer are provided on a same side of the base substrate.

Figure 2:
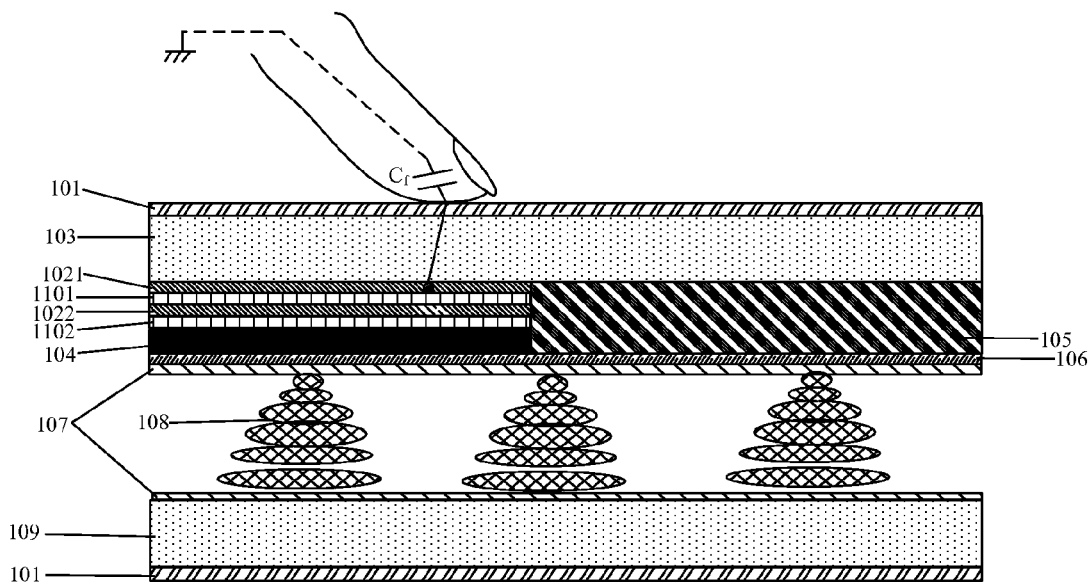
FIG. 2 is a structural schematic view illustrating a touch display panel according to an embodiment of the invention.

For example, in the touch display panel according to the embodiment of the invention, a second conductive layer and a second insulation layer are further formed on the base substrate of the color filter substrate. As shown in FIG. 2, a reference number 101 refers to a polarizing film, and a reference number 103 refers to the base substrate of the color filter substrate. The first conductive layer 1021 is formed on the base substrate 103, the first insulation layer 1101 is formed on the first conductive layer 1021, the second conductive 1022 is formed on the first insulation layer 1101, the second insulation layer 1102 is formed on the second conductive layer 1022, and the black matrix 104 is formed on the second insulation layer 1102. The pattern of the black matrix 104 is same as the pattern of the first conductive layer 1021, and the black matrix 104, the first conductive layer 1021, the first insulation layer 1101, the second conductive layer 1022 and the second insulation layer 1102 are all provided on the same side of the base substrate 103. In addition, layers of the conventional color filter substrate may be further formed on the base substrate 103, such as a color filter layer 105, a common electrode layer 106, and an alignment layer 107, etc. The touch display panel according to the embodiment of the invention further comprises an array substrate 109 and liquid crystal 108. The color filter substrate and the array substrate 109 are bonded with each other, and the liquid crystal 108 is filled between the color filter substrate and the array substrate 109. A pattern of the second conductive layer 1022 in the display region is same as the pattern of the first conductive layer 1021 in the display region. A pattern of the first insulation layer 1101 in the display region and a pattern of the second insulation layer 1102 in the display region are same as the pattern of the first conductive layer 1021 in the display region.

In the touch display panel according to the embodiment of the invention, the first conductive layer 1021 having same pattern as that of the black matrix is formed, and the first conductive layer 1021 is fabricated on an inner side of the color filter substrate. Thereby, the display effect of the touch display panel is not degraded and the base substrate reversal process is omitted, so that the complexity of the process of fabricating the touch display panel can be reduced. In addition, it is not necessary to fabricate the conductive layer on the entire surface of the base substrate, so that the transmittance of the touch display panel can be improved. In addition, the second conductive layer can effectively shield signal interference of the display screen to the surface capacitance.

In addition, an embodiment of the invention further provides a display device, and the display device comprises the above-mentioned touch display panel. Moreover, the display device may further comprise other components such as a backlight.

The foregoing embodiments merely are exemplary embodiments of the invention, and not intended to define the scope of the invention, and the scope of the invention is determined by the appended claims.

What is claimed is:

1. A touch display panel, comprising a color filter substrate, wherein
    a first conductive layer is formed on a base substrate of the color filter substrate, and a first insulation layer is formed on the first conductive layer;
    a pattern of the first conductive layer is same as a pattern of a black matrix that is formed on the base substrate; and
    a pattern of the first insulation layer in a display region of the touch display panel is same as a pattern of the first conductive layer in the display region.

2. The touch display panel according to claim 1, wherein the black matrix is formed on the first insulation layer, and the black matrix, the first conductive layer and the first insulation layer are provided on a same side of the base substrate.

3. The touch display panel according to claim 1, wherein
a second conductive layer is formed on the first insulation layer, and the second conductive layer is grounded;
a second insulation layer is formed on the second conductive layer;
a pattern of the second conductive layer in the display region is same as the pattern of the first conductive layer in the display region; and
a pattern of the second insulation layer in the display region is same as the pattern of the first conductive layer in the display region.

4. The touch display panel according to claim 3, wherein the black matrix is formed on the second insulation layer, and the black matrix, the first conductive layer, the first insulation layer, the second conductive layer and the second insulation layer are provided on a same side of the base substrate.

5. A display device, comprising a touch display panel according to claim 1.

6. The display device according to claim 5, wherein the black matrix is formed on the first insulation layer, and the black matrix, the first conductive layer and the first insulation layer are provided on a same side of the base substrate.

7. The display device according to claim 5, wherein
a second conductive layer is formed on the first insulation layer, and the second conductive layer is grounded;
a second insulation layer is formed on the second conductive layer;
a pattern of the second conductive layer in the display region is same as the pattern of the first conductive layer in the display region; and
a pattern of the second insulation layer in the display region is same as the pattern of the first conductive layer in the display region.

8. The display device according to claim 7, wherein the black matrix is formed on the second insulation layer, and the black matrix, the first conductive layer, the first insulation layer, the second conductive layer and the second insulation layer are provided on a same side of the base substrate.

9. A fabrication method of a touch display panel, the touch display panel comprising a color filter substrate, wherein
the method comprises: forming a first conductive layer on a base substrate of the color filter substrate by using a mask which is same as a mask for forming a black matrix; and forming a first insulation layer on the base substrate on which the first conductive layer has been formed; and
a pattern of the first insulation layer in the display region of the touch display panel is same as a pattern of the first conductive layer in the display region.

10. The fabrication method of the touch display panel according to claim 9, wherein after forming the first insulation layer, the method further comprises:
forming the black matrix by using the mask for forming the black matrix on the base substrate on which the first insulation layer has been formed.

11. The fabrication method of the touch display panel according to claim 9, wherein
after forming the first insulation layer, the method further comprises: forming a second conductive layer on the base substrate on which the first insulation layer has been formed, and forming a second insulation layer on the base substrate on which the second conductive layer has been formed;
the second conductive layer is grounded;
a pattern of the second conductive layer in the display region is same as the pattern of the first conductive layer in the display region; and
a pattern of the second insulation layer in the display region is same as the pattern of the first conductive layer in the display region.

12. The fabrication method of a touch display panel according to claim 11, wherein after forming the second insulation layer, the method further comprises:
forming the black matrix by using the mask for forming the black matrix on the base substrate on which the first insulation layer has been formed.

* * * * *